US007051424B2

(12) United States Patent
Yao et al.

(10) Patent No.: US 7,051,424 B2
(45) Date of Patent: May 30, 2006

(54) METHOD AND APPARATUS FOR ELECTRICALLY AND PHYSICALLY COUPLING A MICRO-ACTUATOR AND SLIDER TO A HARD DRIVE ARM SUSPENSION FOR COMPONENT REPLACEMENT AFTER DETACHMENT FROM THE SUSPENSION

(75) Inventors: Minggao Yao, Dongguan (CN); Masashi Shiraishi, Kowloon (HK)

(73) Assignee: SAE Magnetics (H.K.) Ltd., Shatin (HK)

( * ) Notice: Subject to any disclaimer, the term of this patent is extended or adjusted under 35 U.S.C. 154(b) by 41 days.

(21) Appl. No.: 10/306,285

(22) Filed: Nov. 26, 2002

(65) Prior Publication Data
US 2003/0196315 A1 Oct. 23, 2003

(30) Foreign Application Priority Data
Apr. 22, 2002 (WO) .................... PCT/CN02/00273

(51) Int. Cl.
*G11B 5/127* (2006.01)
*H04R 31/00* (2006.01)
(52) U.S. Cl. .............................. 29/603.06; 29/603.02; 29/603.03; 29/603.04; 29/737; 29/739; 29/840; 83/25; 83/42; 83/103; 156/268; 156/344; 228/175; 228/180.22; 228/219; 360/234.5; 360/294.3; 360/294.4; 360/294.5; 360/245.9; 438/455; 438/458; 438/976
(58) Field of Classification Search ..............................
29/603.02–603.04, 603.06, 737, 739, 840; 156/268, 344; 83/25, 42, 103; 228/175, 228/180.22, 219; 438/455, 458, 976; 360/234.5, 360/294.4, 294.5–7, 245.9
See application file for complete search history.

(56) References Cited

U.S. PATENT DOCUMENTS

| | | | | | |
|---|---|---|---|---|---|
| 5,530,604 | A | * | 6/1996 | Pattanaik ................. | 360/234.5 |
| 5,821,494 | A | * | 10/1998 | Albrecht et al. ........ | 219/121.64 |
| 5,864,445 | A | | 1/1999 | Bennin et al. .............. | 360/104 |
| 5,889,636 | A | * | 3/1999 | Arya et al. .............. | 360/234.5 |
| 6,829,818 | B1 | * | 12/2004 | Kamigama et al. ...... | 29/603.06 |

FOREIGN PATENT DOCUMENTS

| | | | |
|---|---|---|---|
| JP | 8288564 | A | 11/1996 |
| JP | 11-16311 | | 1/1999 |
| JP | 2000057548 | A * | 2/2000 |
| JP | 2001-266517 | | 9/2001 |

OTHER PUBLICATIONS

"The effect of bonding sequence on GMR ESD protection"; Zhao, F.G.; Rock Tao; Hong Tian; Electrical Overstress/Electrostatic Discharge Symposiums Proceedings 2000, Sep. 26-28, 2000 pp.: 202-204.*
International Search Report for PCT/CN02/00374 mailed Aug. 2002.

* cited by examiner

*Primary Examiner*—Paul D. Kim
(74) *Attorney, Agent, or Firm*—Kenyon & Kenyon LLP

(57) ABSTRACT

A system and method are disclosed for coupling a replacement micro-actuator to a drive arm suspension after a micro-actuator, such as a defective micro-actuator, has been detached from the suspension.

32 Claims, 11 Drawing Sheets

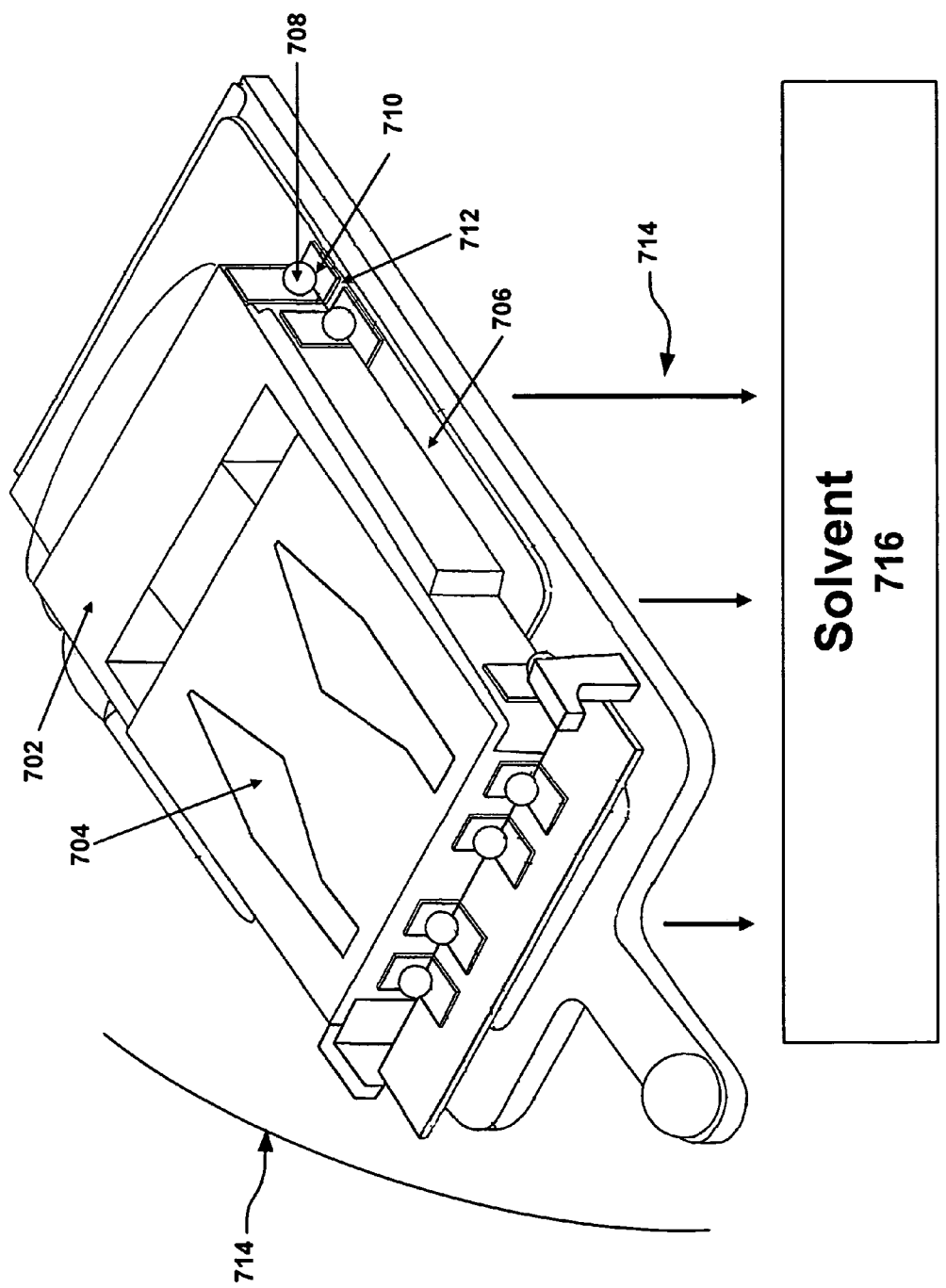

METHOD AND APPARATUS FOR ELECTRICALLY AND PHYSICALLY COUPLING A MICRO-ACTUATOR AND SLIDER TO A HARD DRIVE ARM SUSPENSION FOR COMPONENT REPLACEMENT AFTER DETACHMENT FROM THE SUSPENSION

BACKGROUND INFORMATION

The present invention relates to magnetic hard disk drives. More specifically, the present invention relates to a system for coupling a second micro-actuator to a drive arm suspension after a first micro-actuator has been detached from the suspension.

In the art today, different methods are utilized to improve recording density of hard disk drives. FIG. 1 provides an illustration of a typical drive arm configured to read from and write to a magnetic hard disk. Typically, a voice-coil motor (VCM) 102 is used for controlling the motion, across a magnetic hard disk 106, of an arm 104 of a hard drive. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator then corrects the placement on a much smaller scale to compensate for the tolerance of the VCM 102 (with the arm 104). This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

A bonding agent, such as a gold ball bonding (GBB) or a solder bump bonding (SBB) material, or silver epoxy (a typical conductive adhesive made of a binder resin and silver powder) may be used to physically and/or electrically couple components, such as a micro-actuator, to other components, such as a drive arm suspension. (See FIG. 4). Defects in components, such as micro-actuators, sliders (heads), and suspensions, are often discovered after coupling the components or after performance testing. Therefore, a substantial amount of waste occurs when scrapping an assembled structure that contains both defective and operable components.

It is therefore desirable to have a system for coupling a second component, such as a micro-actuator, to an element, such as a drive arm suspension, after a first component, such as a defective micro-actuator, has been detached, as well as having additional benefits.

BRIEF DESCRIPTION OF THE DRAWINGS

FIG. 7 illustrates the 'solvent' method for detaching a 'U'-shaped micro-actuator and slider from a drive arm suspension under principles of the present invention.

DETAILED DESCRIPTION

Figure 1:
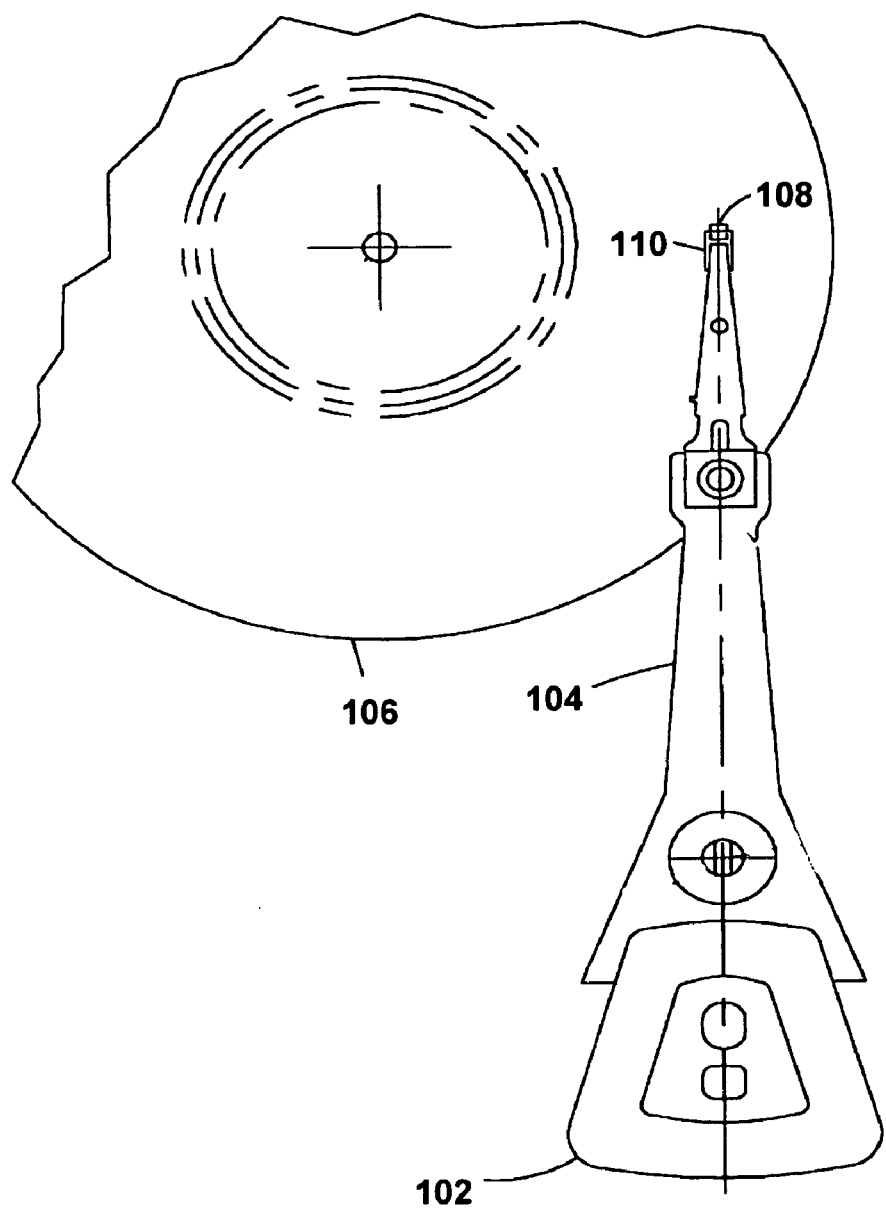
FIG. 1 provides an illustration of a drive arm configured to read from and write to a magnetic hard disk as used in the art.
Figure 2:
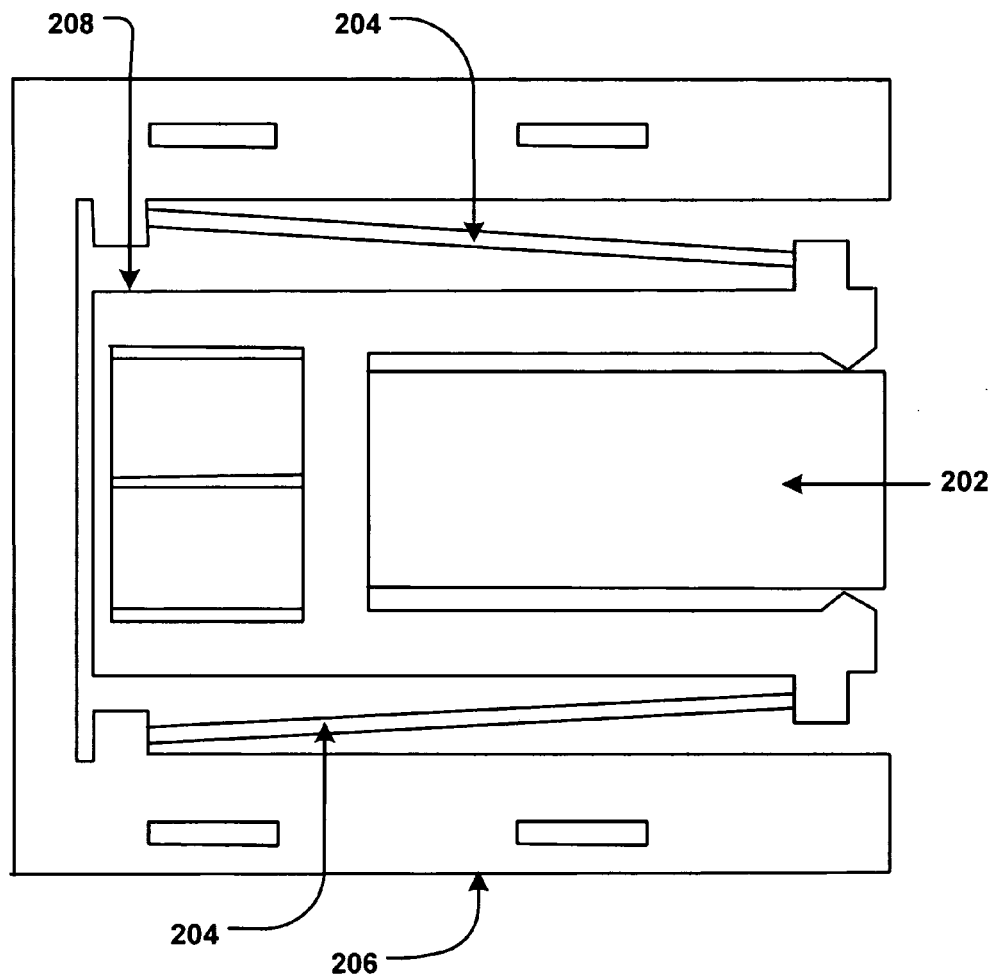
FIG. 2 provides an illustration of a micro-actuator as used in the art.
Figure 3:
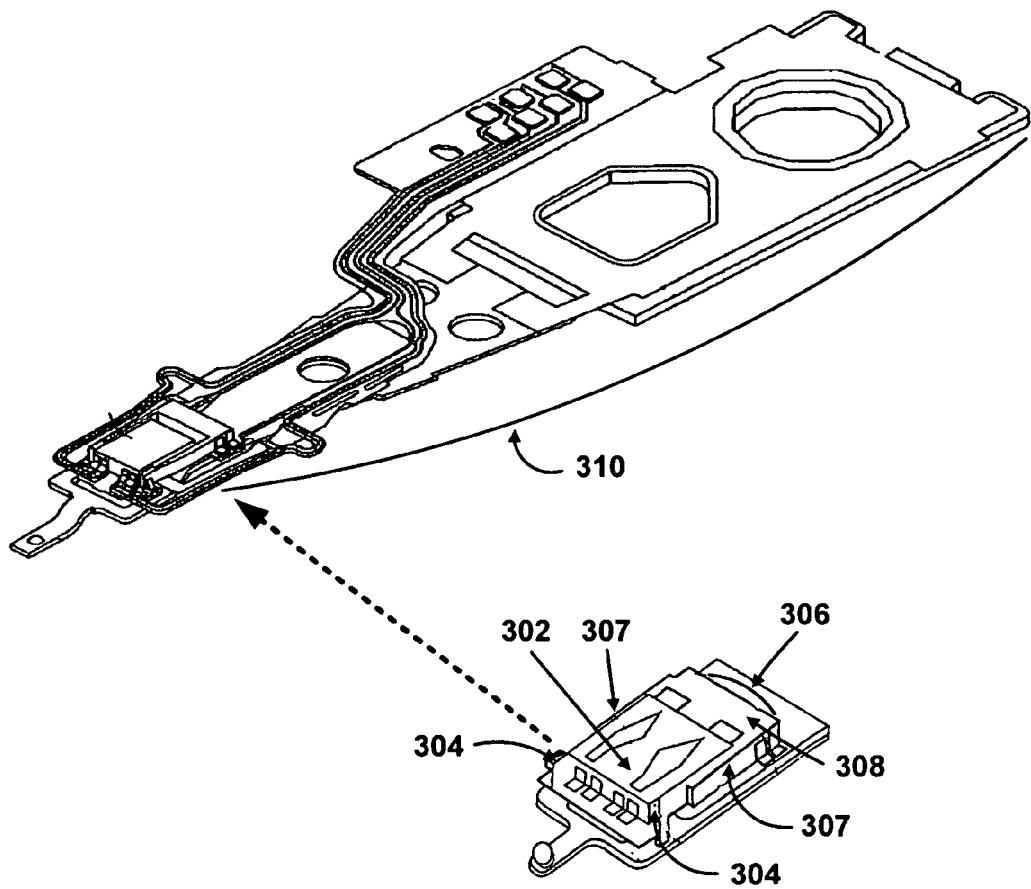
FIG. 3 provides an illustration of a hard disk drive head gimbal assembly (HGA) with a 'U'-shaped micro-actuator under principles of the present invention.

FIG. 3 provides an illustration of a hard disk drive head gimbal assembly (HGA) with a 'U'-shaped micro-actuator under principles of the present invention. In one embodiment, a slider (with read/write head) 302 is bonded at two points 304 to a 'U'-shaped micro-actuator 306. Further, in an embodiment, the 'U'-shaped micro-actuator has a piezoelectric PZT (Piezoelectric Transducer) beam (arm) 307 on each side of a Zirconia support frame (actuator base/bottom arm) 308. As explained below, the micro-actuator is coupled to and supported by an arm suspension 310. In other embodiments, the support frame 308 is made of a metal, such as stainless steel or aluminum, or a polymer, such as polyethylene or polyester.

Figure 4:
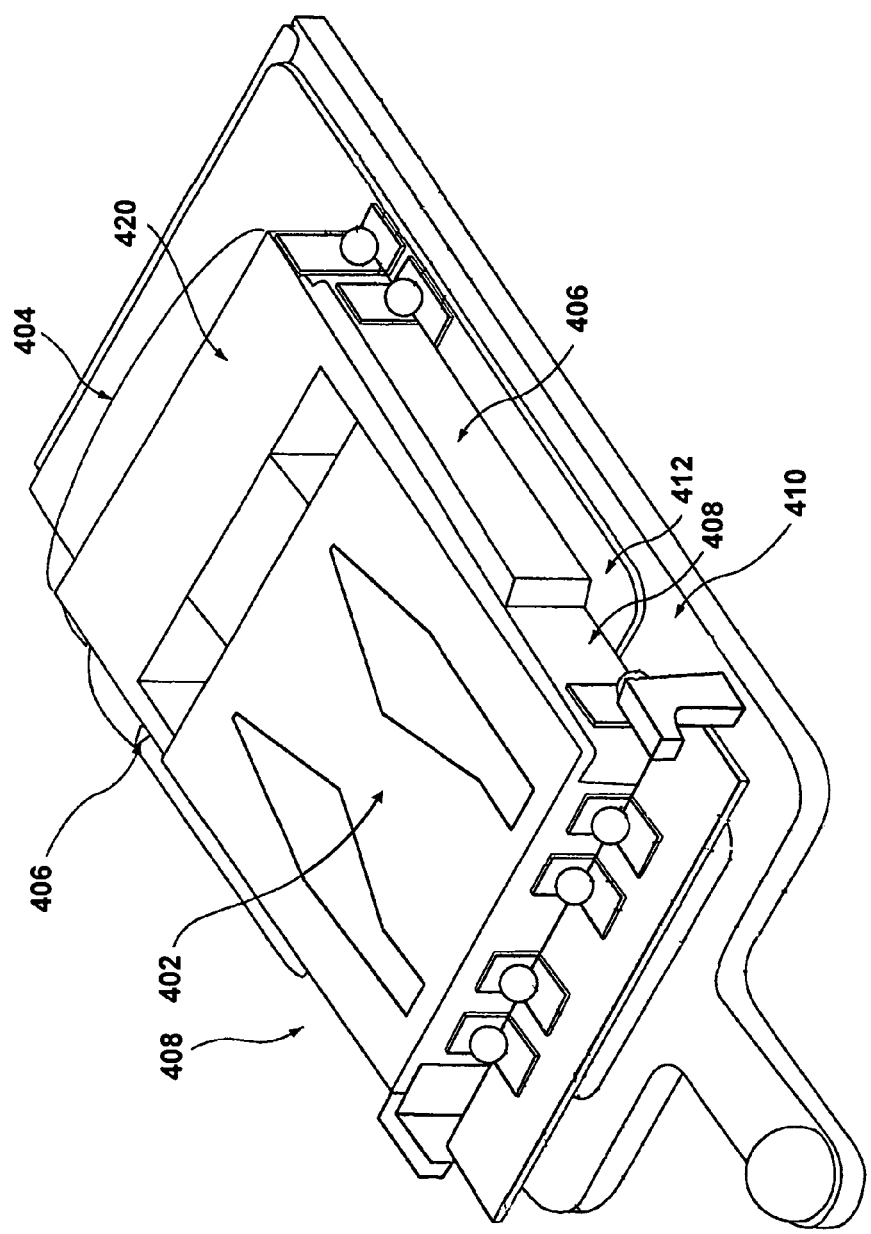
FIG. 4 provides a detailed illustration of a magnetic head (and slider) 402 with a 'U'-shaped micro-actuator 404 under principles of the present invention.

FIG. 4 provides a detailed illustration of a magnetic head (and slider) 402 with a 'U'-shaped micro-actuator 404 under principles of the present invention. PZT material has an anisotropic structure whereby the charge separation between the positive and negative ions provides for electric dipole behavior. When a potential is applied across a poled piezoelectric material, Weiss domains increase their alignment proportional to the voltage, resulting in structural deformation (i.e. regional expansion/contraction) of the PZT material. The PZT structures 406 bend (in unison), the Zirconia arms 408, which are bonded to the PZT structures 406 bend also, causing the head/slider 402 to adjust its position in relation to the micro-actuator 404 (for magnetic head fine adjustments). As explained below, the bottom arm 420 is secured to the suspension tongue 412 (by a bonding agent, such as epoxy), maintaining the orientation of the suspension 410.

Figure 5:
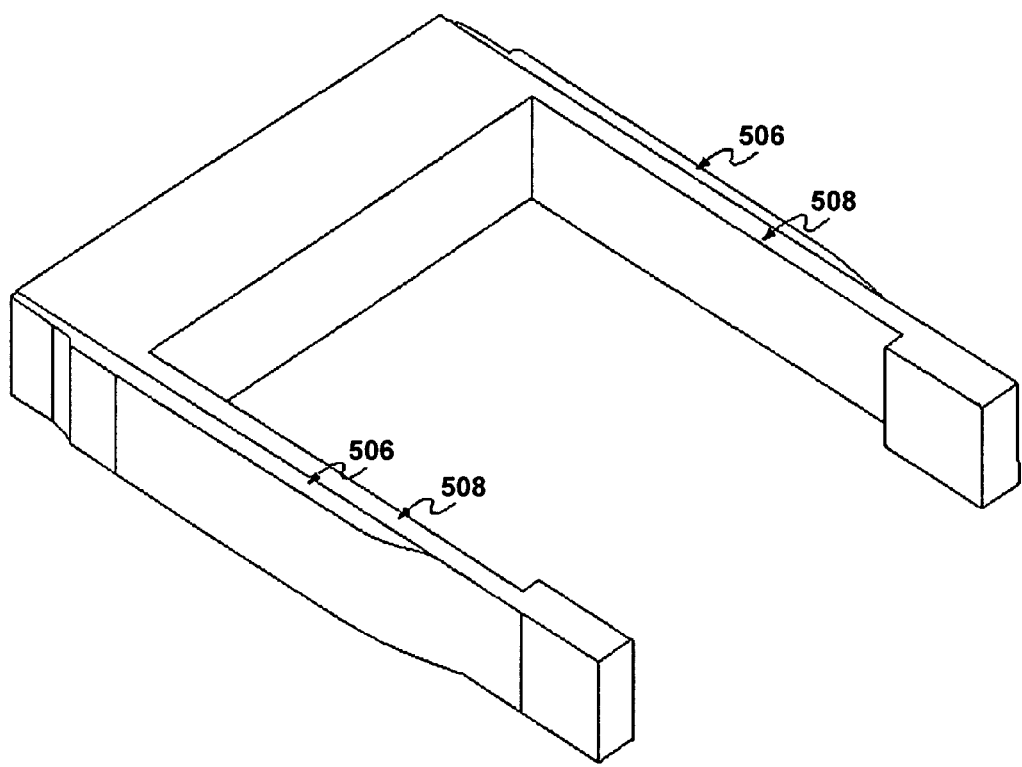
FIG. 5 provides an illustration of a 'U'-shaped micro-actuator for further explanation under principles of the present invention.
Figure 6A:
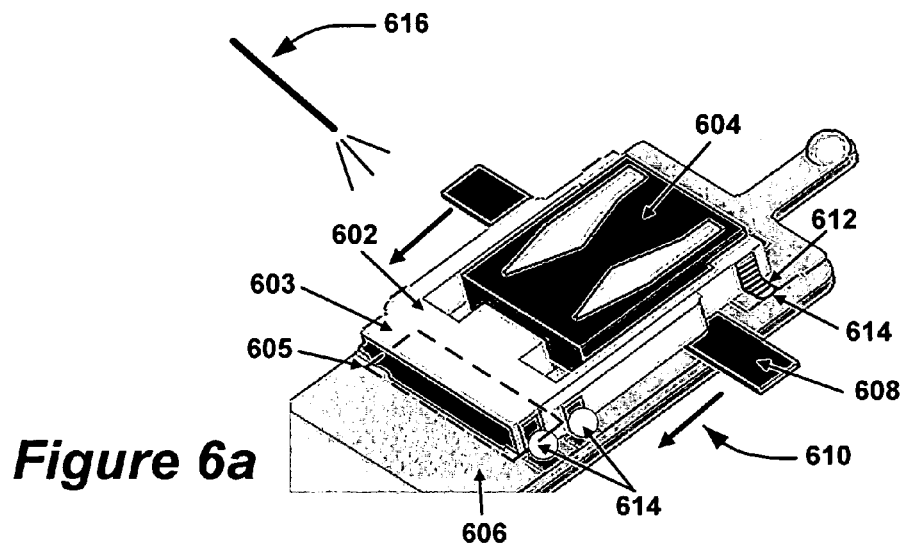
FIG. 6 illustrates the 'cutting' method for detaching a 'U'-shaped micro-actuator and slider from a drive arm suspension under principles of the present invention.
Figure 6B:
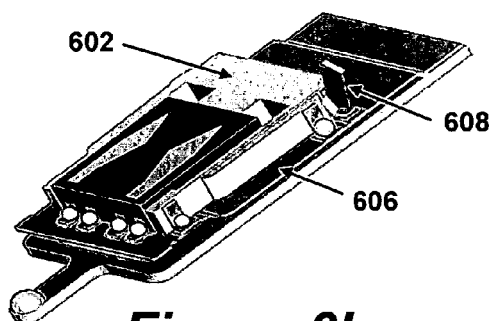
Figure 6C:
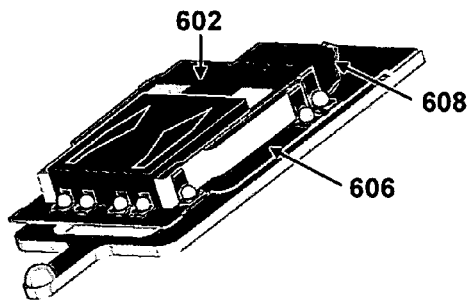
Figure 6D:
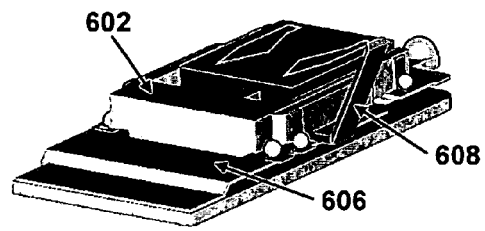

FIG. 5 provides an illustration of a 'U'-shaped micro-actuator for further explanation under principles of the present invention. As stated above, when a potential is applied across a poled piezoelectric material, structural deformation (i.e. regional expansion/contraction) of the PZT material results. As the PZT structures 506 bend (in unison), the Zirconia arms 508, which are bonded to the PZT structures 506 bend also, causing the head/slider (not shown) to adjust its position in relation to the micro-actuator (for magnetic head fine adjustments).

FIG. 6 illustrates the 'cutting' method for detaching a 'U'-shaped micro-actuator 602 and slider 604 from a drive arm suspension 606 under principles of the present invention. As shown in FIG. 6a, in one embodiment a cutting element 608, such as a thin knife or shim, is inserted between the micro-actuator 602/slider 604 and suspension 606 and moved 610 along the suspension's 606 length within the cutting element's 608 'sandwiched' position to sever 612 the site(s) 614 of bonding agent. In an alternative embodiment, cutting can be performed from the side of the micro-actuator 602 (not 'sandwiched' between micro-actuator and suspension) by a knife of various configurations. (See FIGS. 6b, 6c, and 6d). In another embodiment, cutting can be performed by an integrated laser beam, a focused ion beam, or via an ion-sputtering device.

In one embodiment, heat is applied via a heating element 616 to the structure to soften and weaken any resin bonding agents 605, such as ultraviolet (UV) epoxy or other resin epoxy, coupling the micro-actuator bottom arm 603 and suspension 606. This is done to aid in the detachment process. In another embodiment, ultrasonic pulses (not shown) are applied to weaken the resin bonding agent 605, aiding in the detachment process.

FIG. 7 illustrates the 'solvent' method for detaching a 'U'-shaped micro-actuator 702 and slider 704 from a drive arm suspension 706 under principles of the present invention. In one embodiment, if a layer of filler material 710, such as silver paste or adhesive conductive film (ACF), exists between the bonding agent 708 and the suspension bond pad 712, (see FIG. 9) detachment can be achieved by applying a releasing agent, such as a solvent 716, to the filler material 710. In one embodiment, this is done by submerging the structure 714 in solvent 716.

Figure 8:
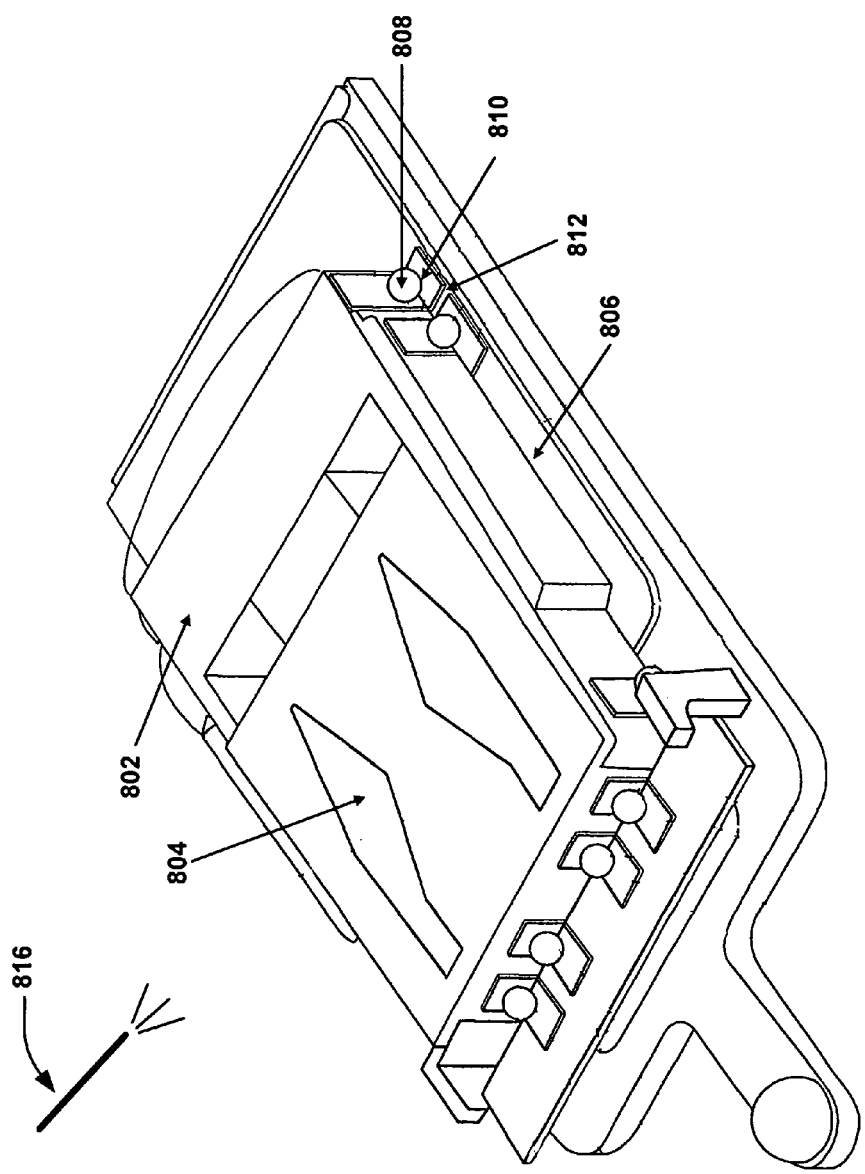
FIG. 8 illustrates the 'heat' method for detaching a 'U'-shaped micro-actuator and slider from a drive arm suspension under principles of the present invention.

FIG. 8 illustrates the 'heat' method for detaching a 'U'-shaped micro-actuator 802 and slider 804 from a drive arm suspension 806 under principles of the present invention. In one embodiment, if a layer of filler material 810, such as silver paste or adhesive conductive film (ACF), exists between the bonding agent 808 and the suspension bond pad 812, (see FIG. 9) detachment can be achieved by applying heat, such as by a heating element 816, to the filler material 810.

Figure 9:
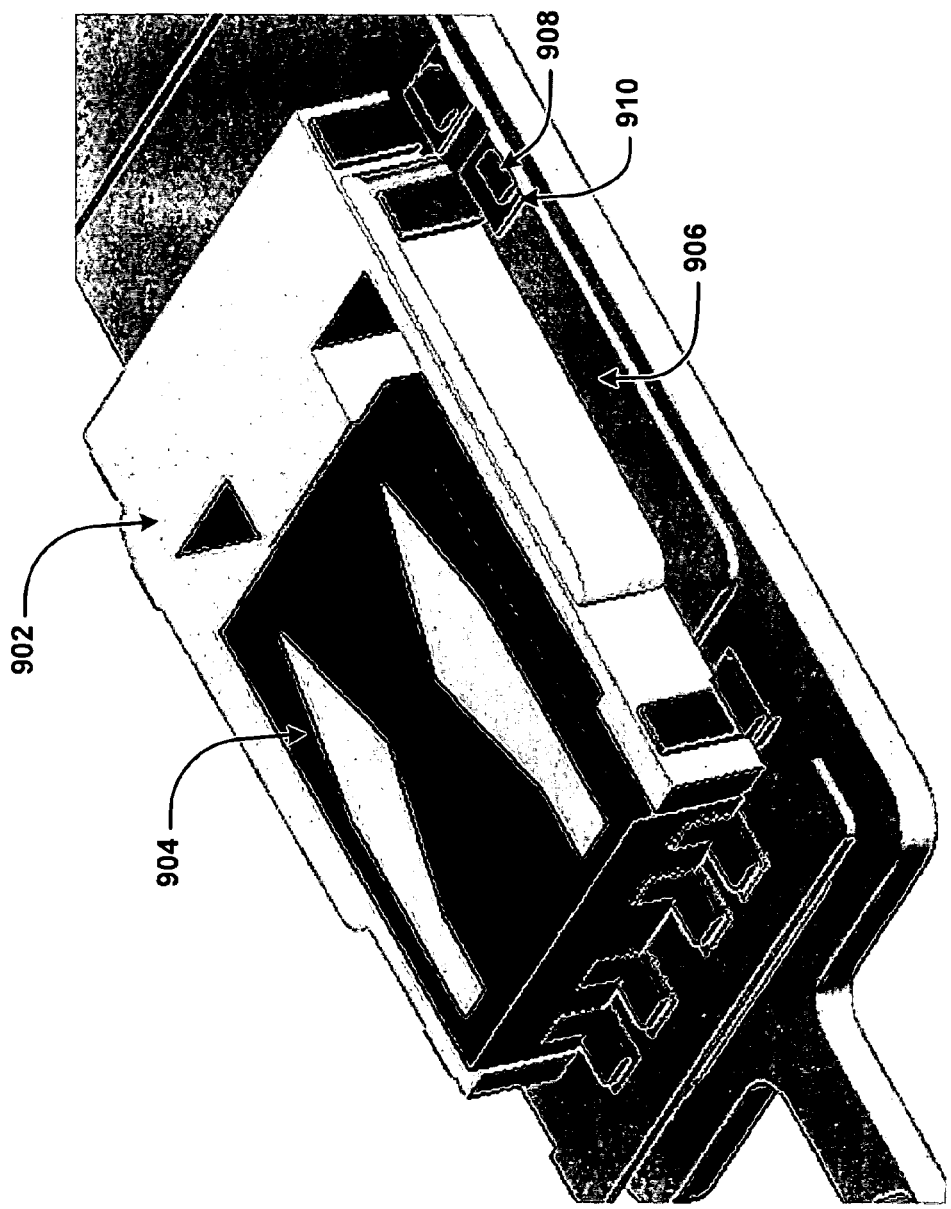
FIG. 9 illustrates placement of filler material upon suspension bond pad(s) in preparation for coupling a 'U'-shaped micro-actuator and slider from a drive arm suspension under principles of the present invention.

FIG. 9 illustrates placement of filler material 908 upon suspension bond pad(s) 910 in preparation for coupling a 'U'-shaped micro-actuator 902 and slider 904 from a drive arm suspension 806 under principles of the present invention. As stated above, a defective component (e.g., micro-actuator 902, slider 904, or suspension 906) can be separated by cutting (or solvent-releasing, heat-releasing, etc.) the bond(s) to the defective component. After detachment, the surface of the bond pad(s) 910 is rough (from the cutting, etc.). The bond pad 910 surface may be damaged (scored) and traces of the original bonding agent may still remain, leaving a poor surface for coupling a replacement micro-actuator 902, etc. To improve the bond pad surface for electrical and/or physical coupling, in one embodiment, a layer of filler material 908, such as silver paste or adhesive conductive film (ACF), is applied to the bond pad 910. The filler material fills in the low points in the bond pad surface 910, providing an improved (smooth) surface for electron flow/physical adhesion.

Figure 10:
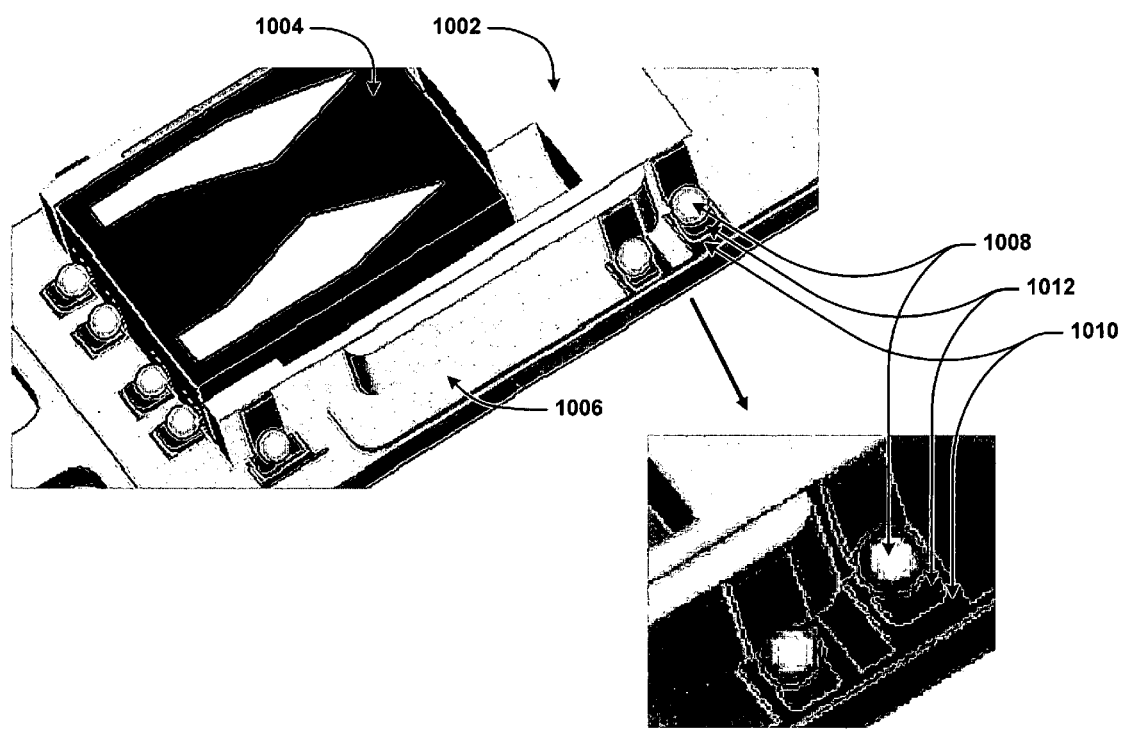
FIG. 10 illustrates placement of the bonding agent to couple a replacement micro-actuator/slider to-the suspension-under principles of the present invention.

FIG. 10 illustrates placement of the bonding agent 1008 to couple a replacement micro-actuator 1002/slider 1004 to the suspension 1006 under principles of the present invention. In one embodiment, a bonding agent, such as a gold ball bonding (GBB) material or a solder bump bonding (SBB) material, is applied to the bond pad 1010, which has been treated with filler material 1012 for improved coupling and easier detachment (via heat or solvent, see FIGS. 7 and 8).

Figure 11:
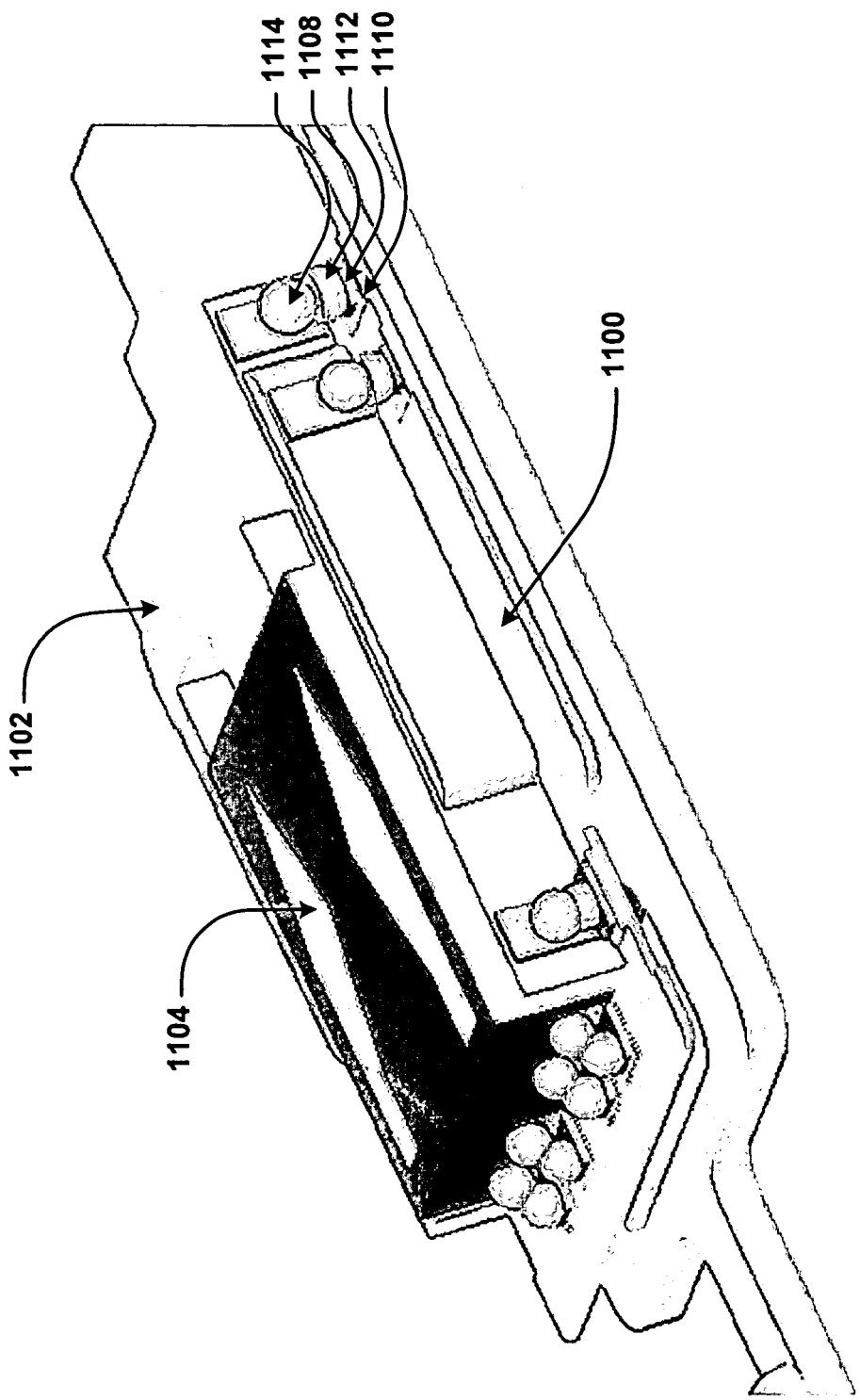
FIG. 11 illustrates the utilization of a two-part bonding agent application under principles of the present invention.

FIG. 11 illustrates the utilization of a two-part bonding agent application under principles of the present invention. In one embodiment of the invention, a preliminary bonding agent (intermediate bonding agent) 1108, such as a gold ball bonding (GBB) material or a solder bump bonding (SBB) material, is applied to the suspension bond pad 1110 (or to the micro-actuator) and/or filler material 1112. A bonding agent (second bonding agent) 1114 is applied to couple the preliminary bonding agent site 1108 (and thus, the suspension 1106) to the micro-actuator 1102 or slider 1104. This minimizes the risk of bonding agent residue and/or low points in the surface (by prior cutting) causing poor conduction between micro-actuator/slider and suspension. In an alternative embodiment, the original (first) bonding agent is cut such that it or a portion of it remains on the suspension 1106 (or micro-actuator 1102) after detachment. The remaining bonding agent serves as the preliminary bonding agent 1108 for the second bonding agent 1114 to adhere.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to couple a second actuator element to a suspension element after a first actuator element has been detached from said suspension element, comprising:
   an electrically-conductive filler material applied to a suspension bond pad and a first bonding agent remaining on said suspension bond pad after bond separation to provide an improved bonding surface; and
   a second bonding agent coupling said remaining first bonding agent to a bond pad of a second actuator element.

2. The system of claim 1, wherein the first actuator element is detached from said suspension element by a cutting element severing said first bonding agent.

3. The system of claim 2, wherein detachment is aided by a heater element, which heats said first bonding agent.

4. The system of claim 2, wherein detachment is aided by ultrasonic pulses applied to said first bonding agent.

5. The system of claim 2, wherein the cutting element is selected from the group consisting of a shim, a knife, an integrated laser beam, and a focused ion beam.

6. The system of claim 1, further comprising:
   a filler material between said first bonding agent and said suspension bond pad, wherein the first actuator element is detached from said suspension element by a releasing agent applied to said filler material.

7. The system of claim 6, wherein said releasing agent is a solvent.

8. The system of claim 1, further comprising:
   a filler material between said first bonding agent and said suspension bond pad, wherein the first actuator element is detached from said suspension element by heating said filler material.

9. The system of claim 1, wherein said first bonding agent is a conductor ball bonding material and said second bonding agent is a conductor ball banding material.

10. The system of claim 1, wherein the first bonding agent is a material selected from the group consisting of a gold ball bonding (GBB) material and a solder bump banding (SBB) material.

11. The system of claim 1, wherein the second bonding agent is a material selected from the group consisting of a gold ball bonding (GBB) material and a solder bump bonding (SBB) material.

12. The system of claim 1, wherein said filler material is a material selected from the group consisting of silver paste, and an adhesive conductive film (ACF).

13. The system of claim 12, further comprising:
an intermediate bonding agent, wherein said intermediate bonding agent is applied to said suspension bond pad before application of said second bonding agent to leave said intermediate bonding agent sandwiched between said second bonding agent and said suspension bond pad.

14. The system of claim 13, wherein said intermediate bonding agent is a material selected from the group consisting of a gold ball bonding (GBB) material, and a solder bump bonding (SBB) material.

15. The system of claim 1, wherein the first bonding agent is cut to leave an intermediate bonding agent attached to said suspension and wherein said second bonding agent is applied to couple said actuator element to said intermediate bonding agent.

16. The system of claim 1, wherein the first bonding agent is cut to leave an intermediate bonding agent attached to said actuator element and wherein said second bonding agent is applied to couple said suspension to said intermediate bonding agent.

17. A method to couple a second actuator element to a suspension element after a first actuator element has been detached from said suspension element, comprising:
applying an electrically-conductive filler material to a suspension bond and a first bonding agent remaining on said suspension bond pad after bond separation to provide an improved bonding surface; and
coupling, by a second bonding agent, said remaining first bonding agent to a bond of a second actuator element.

18. The method of claim 17, wherein the first actuator element is detached from said suspension element by a cutting element severing said first bonding agent.

19. The method of claim 18, wherein detachment is aided by a heater element, which heats said first bonding agent.

20. The method of claim 18, wherein detachment is aided by ultrasonic pulses applied to said first bonding agent.

21. The method of claim 18, wherein the cutting element is selected from the group consisting of a shim, a knife, an integrated laser beam, and a focused ion beam.

22. The method of claim 17, further comprising:
detaching the first actuator element from said suspension element by a releasing agent applied to a filler material, said filler material being located between said first bonding agent and said suspension bond pad.

23. The method of claim 22, wherein said releasing agent is a solvent.

24. The method of claim 17, further comprising:
detaching the first actuator element from said suspension element by heating a filler material, said filler material being located between said first bonding agent and said suspension bond pad.

25. The method of claim 17, wherein said first bonding agent is a conductor ball bonding material and said second bonding agent is a conductor ball bonding material.

26. The method of claim 17, wherein the first bonding agent is a material selected from the group consisting of a gold ball bonding (GBB) material and a solder bump bonding (SBB) material.

27. The method of claim 17, wherein the second bonding agent is a material selected from the group consisting of a gold ball bonding (GBB) material and a solder bump bonding (SBB) material.

28. The method of claim 17, wherein said filler material is a material selected from the group consisting of silver paste, and an adhesive conductive film (ACF).

29. The method of claim 28, further comprising:
an intermediate bonding agent, wherein said intermediate bonding agent is applied to said suspension bond pad before application of said second bonding agent to leave said intermediate bonding agent sandwiched between said second bonding agent and said suspension bond pad.

30. The method of claim 29, wherein said intermediate bonding agent is a material selected from the group consisting of a gold ball bonding (GBB) material, and a solder bump bonding (SBB) material.

31. The method of claim 17, wherein the first bonding agent is cut to leave an intermediate bonding agent attached to said suspension and wherein said second bonding agent is applied to couple said actuator element to said intermediate bonding agent.

32. The method of claim 17, wherein the first bonding agent is cut to leave an intermediate bonding agent attached to said actuator element and wherein said second bonding agent is applied to couple said suspension to said intermediate bonding agent.

* * * * *

UNITED STATES PATENT AND TRADEMARK OFFICE
CERTIFICATE OF CORRECTION

PATENT NO. : 7,051,424 B2  Page 1 of 1
APPLICATION NO. : 10/306285
DATED : May 30, 2006
INVENTOR(S) : Ming Gao Yao et al.

It is certified that error appears in the above-identified patent and that said Letters Patent is hereby corrected as shown below:

Column 5, line 3: "banding" should be --bonding--

Column 5, line 6: "banding" should be --bonding --

Signed and Sealed this

Twenty-first Day of November, 2006

JON W. DUDAS
*Director of the United States Patent and Trademark Office*